United States Patent
Khairnar et al.

(10) Patent No.: US 10,218,542 B1
(45) Date of Patent: Feb. 26, 2019

(54) CHANNEL ESTIMATE IMPROVEMENT WITH L-LTF AND HT-LTF AVERAGING

(71) Applicant: Marvell International Ltd., Hamilton (BM)

(72) Inventors: Parag Suresh Khairnar, Maharashtra (IN); Vijay Ahirwar, Madhya Pradesh (IN); Sudhir Srinivasa, Campbell, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/783,893

(22) Filed: Oct. 13, 2017

Related U.S. Application Data

(60) Provisional application No. 62/408,689, filed on Oct. 14, 2016.

(51) Int. Cl.
| | |
|---|---|
| *H04L 25/02* | (2006.01) |
| *H04L 25/03* | (2006.01) |
| *H04L 27/26* | (2006.01) |
| *H04B 7/06* | (2006.01) |

(52) U.S. Cl.
CPC ........ *H04L 25/024* (2013.01); *H04L 25/0232* (2013.01); *H04L 25/03159* (2013.01); *H04B 7/0617* (2013.01); *H04L 25/0204* (2013.01); *H04L 27/2621* (2013.01)

(58) Field of Classification Search
CPC . H04B 7/0617; H04L 25/024; H04L 25/0232; H04L 25/03159; H04L 25/0204; H04L 27/2621
See application file for complete search history.

(56) References Cited

U.S. PATENT DOCUMENTS

| | | |
|---|---|---|
| 9,252,999 B1 | 2/2016 | Zhang et al. |
| 2006/0159196 A1 | 7/2006 | Kwun et al. |

(Continued)

OTHER PUBLICATIONS

Gunnam et al., "Multi-Rate Layered Decoder Architecture for Block LDPC Codes of the IEEE 802.11n Wireless Standard", IEEE, pp. 1645-1648, 2007.

(Continued)

*Primary Examiner* — David S Huang

(57) ABSTRACT

Systems, devices, and techniques relating to multi-symbol channel estimation are described. A described technique includes receiving a signal comprising first and second training symbols, and one or more data symbols; determining first and second channel estimates for subcarriers respectively based on the first and second training symbols; determining a dynamic timing advance estimate based on the first training symbol to adjust a sampling time for a remaining portion of the signal; determining one or more phase differences between the first and second training symbols for the subcarriers respectively based on angular versions of the first and second channel estimates; rotating the first channel estimates based on the dynamic timing advance estimate and the one or more phase differences; producing combined channel estimates based on the second channel estimates and the rotated first channel estimates; and processing the one or more data symbols based on the combined channel estimates.

20 Claims, 7 Drawing Sheets

(56) References Cited

U.S. PATENT DOCUMENTS

2007/0081602 A1* 4/2007 Tanaka ................ H04B 7/0697
                                                  375/260
2011/0194475 A1   8/2011 Kim et al.
2015/0117575 A1* 4/2015 Ganesan ............ H04L 27/2695
                                                  375/347

OTHER PUBLICATIONS

IEEE P802.11ac/D2.1; Part 11: Wireless LAN Medium Access Control (MAC) and Physical layer (PHY) Specifications/ Amendment 4: Enhancements for Very High Throughput for Operation in Bands below 6 GHz, Mar. 2012, pp. 1-338.

IEEE Std. 802.11a-1999; Part 11: Wireless LAN Medium Access Control (MAC) and Physical Layer (PHY) Specifications: High-speed Physical Layer in the 5 GHz Band, LAN/MAN Standards Committee of the IEEE Computer Society, Sep. 16, 1999, pp. 1-83.

IEEE Std. 802.11-2012; Part 11: Wireless LAN Medium Access Control (MAC) and Physical Layer (PHY) Specifications, IEEE Computer Society, Mar. 29, 2012, pp. 1-2695.

* cited by examiner

CHANNEL ESTIMATE IMPROVEMENT WITH L-LTF AND HT-LTF AVERAGING

CROSS REFERENCE TO RELATED APPLICATIONS

This present disclosure claims the benefit of the priority of U.S. Provisional Application Ser. No. 62/408,689, filed Oct. 14, 2016, and entitled "CHANNEL ESTIMATE IMPROVEMENT WITH LLTF AND HTLTF AVERAGING," which is incorporated herein by reference in its entirety.

BACKGROUND

This disclosure relates to channel estimation in wireless communication systems, including Wireless Local Area Networks (WLANs).

Wireless communication systems can include multiple wireless communication devices that communicate over one or more wireless channels. When operating in an infrastructure mode, a wireless communication device called an access point (AP) provides connectivity with a network, such as the Internet, to other wireless communication devices, which can be referred to as client stations (STAs), client devices, clients, or access terminals (ATs). Various examples of wireless communication devices include mobile phones, smart phones, wireless routers, and wireless hubs. In some cases, wireless communication electronics are integrated with data processing equipment such as laptops, personal digital assistants, and computers.

Wireless communication devices in a WLAN can use one or more protocols for a medium access control (MAC) layer and a physical (PHY) layer. For example, a wireless communication device can use a Carrier Sense Multiple Access (CSMA) with Collision Avoidance (CA) based protocol for a MAC layer and Orthogonal Frequency Division Multiplexing (OFDM) for the PHY layer. The MAC layer can communicate with a Physical Layer Convergence Protocol (PLCP) sublayer. After receiving a MAC protocol data unit (MPDU) from the MAC layer, the PLCP sublayer can include PHY specific preamble fields to form a PLCP protocol data unit (PPDU) for transmission. A MPDU can also be called a PLCP service data unit (PSDU). A PPDU can include one or more training fields to enable channel estimation at a receiver.

Wireless communication systems, such as WLANs, can use one or more wireless communication technologies, such as OFDM for a PHY layer. In an OFDM based wireless communication system, a data stream can be split into multiple data substreams. Such data substreams are sent over different OFDM subcarriers, which are commonly also referred to as tones or frequency tones. WLANs such as those defined in the Institute of Electrical and Electronics Engineers (IEEE) wireless communications standards, e.g., IEEE 802.11n, and IEEE 802.11ac, can use OFDM to transmit and receive signals.

SUMMARY

The present disclosure includes systems, devices, and techniques for multi-symbol channel estimation. According to an aspect of the present disclosure, a technique for multi-symbol channel estimation includes receiving, over a channel, a signal including a first training symbol, a second training symbol, and one or more data symbols, the first training symbol and the second training symbol each include subcarriers; determining first channel estimates for the subcarriers respectively based on the first training symbol and second channel estimates for the subcarriers respectively based on the second training symbol; determining a dynamic timing advance estimate based on the first training symbol to adjust a sampling time for a remaining portion of the signal that includes the second training symbol; determining one or more phase differences between the first training symbol and the second training symbol for the subcarriers respectively based on angular versions of the first channel estimates and angular versions of the second channel estimates; rotating the first channel estimates based on the dynamic timing advance estimate and the one or more phase differences to produce rotated first channel estimates; producing combined channel estimates based on the second channel estimates and the rotated first channel estimates; and processing the one or more data symbols based on the combined channel estimates.

This and other implementations can include one or more of the following features. In some implementations, the one or more phase differences include per subcarrier phase differences. Implementations can include determining per subcarrier timing values based on subcarrier indices and the dynamic timing advance estimate; determining a mean common phase error across the subcarriers based on the per subcarrier phase differences and the per subcarrier timing values; and determining per subcarrier rotation values based on the mean common phase error and the per subcarrier timing values. Rotating the first channel estimates can include using the per subcarrier rotation values. Implementations can include accumulating the per subcarrier phase differences to produce an accumulated phase difference output. The mean common phase error can be based on the accumulated phase difference output.

Implementations can include accumulating, via a first accumulator, the angular versions of the first channel estimates, and accumulating, via a second accumulator, the angular versions of the second channel estimates. In some implementations, one or more phase differences are based on a difference between an output from the second accumulator and an output from the first accumulator. In some implementations, the subcarriers include a first group of subcarriers and a second group of subcarriers, where the first group of subcarriers and the second group of subcarriers are separated by one or more unused subcarriers. Determining one or more phase differences can include performing separate phase unwrap operations for the first group of subcarriers and the second group of subcarriers.

Implementations can include enabling automatic gain control between reception of the first training symbol and reception of the second training symbol; and determining a gain scaling factor to compensate for the automatic gain control. In some implementations, the rotated first channel estimates are based on the gain scaling factor. Implementations can include disabling automatic gain control between reception of the first training symbol and reception of the second training symbol. Determining the first channel estimates can include applying channel smoothing among two or more adjacent subcarriers. Determining the second channel estimates can include applying channel smoothing among two or more adjacent subcarriers. In some implementations, the first training symbol includes a Legacy Long Training Field (L-LTF) symbol. In some implementations, the second training symbol includes a High Throughput Long Training Field (HT-LTF) symbol.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a remote environment monitor, a router, a switch, a computer system component, a medium access unit), an automotive communication system, a mobile computer, a digital camera, a general purpose data processing apparatus such as a computer, or combinations of these.

A device for multi-symbol channel estimation can include a receiver to receive over a channel a signal including a first training symbol, a second training symbol, and one or more data symbols, the first training symbol and the second training symbol each include subcarriers; a channel estimator to determine first channel estimates for the subcarriers respectively based on the first training symbol and to determine second channel estimates for the subcarriers respectively based on the second training symbol; and a timing estimator to determine a dynamic timing advance estimate based on the first training symbol to adjust a sampling time for a remaining portion of the signal that includes the second training symbol. The device can include a compensator to determine one or more phase differences between the first training symbol and the second training symbol for the subcarriers respectively based on angular versions of the first channel estimates and angular versions of the second channel estimates, rotate the first channel estimates based on the dynamic timing advance estimate and the one or more phase differences to produce rotated first channel estimates, and produce combined channel estimates based on the second channel estimates and the rotated first channel estimates. The device can include circuitry to process the one or more data symbols based on the combined channel estimates.

This and other implementations can include one or more of the following features. In some implementations, the one or more phase differences comprise per subcarrier phase differences. In some implementations, the compensator is configured to determine per subcarrier timing values based on subcarrier indices and the dynamic timing advance estimate. In some implementations, the compensator is configured to determine a mean common phase error across the subcarriers based on the per subcarrier phase differences and the per subcarrier timing values. In some implementations, the compensator is configured to determine per subcarrier rotation values based on the mean common phase error and the per subcarrier timing values. Implementations can include an accumulator to accumulate the per subcarrier phase differences to produce an accumulated phase difference output. In some implementations, the mean common phase error is based on the accumulated phase difference output.

Implementations can include a first accumulator to accumulate the angular versions of the first channel estimates, and a second accumulator to accumulate the angular versions of the second channel estimates. In some implementations, the one or more phase differences are based on a difference between an output from the second accumulator and an output from the first accumulator.

In some implementations, the subcarriers comprise a first group of subcarriers and a second group of subcarriers, and the first group of subcarriers and the second group of subcarriers are separated by one or more unused subcarriers. In some implementations, the compensator is configured to determine the one or more phase differences by performing separate phase unwrap operations for the first group of subcarriers and the second group of subcarriers.

In some implementations, the device is configured to enable automatic gain control between reception of the first training symbol and reception of the second training symbol. The compensator can be configured to determine a gain scaling factor to compensate for the automatic gain control. The rotated first channel estimates can be further based on the gain scaling factor. In some implementations, the device is configured to disable automatic gain control between reception of the first training symbol and reception of the second training symbol. In some implementations, the channel estimator is configured to produce the first channel estimates and the second channel estimates by respectively applying channel smoothing among two or more adjacent subcarriers. In some implementations, the first training symbol includes a L-LTF symbol, and the second training symbol includes a HT-LTF symbol.

Particular configurations of the technology described in this disclosure can be implemented so as to realize one or more of the following potential advantages. Combining different training symbols within a packet can increase a device's sensitivity. Increasing a device's sensitivity can enable higher Modulation and Coding Scheme (MCS) modes, e.g., higher data transmission rates, to be used.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
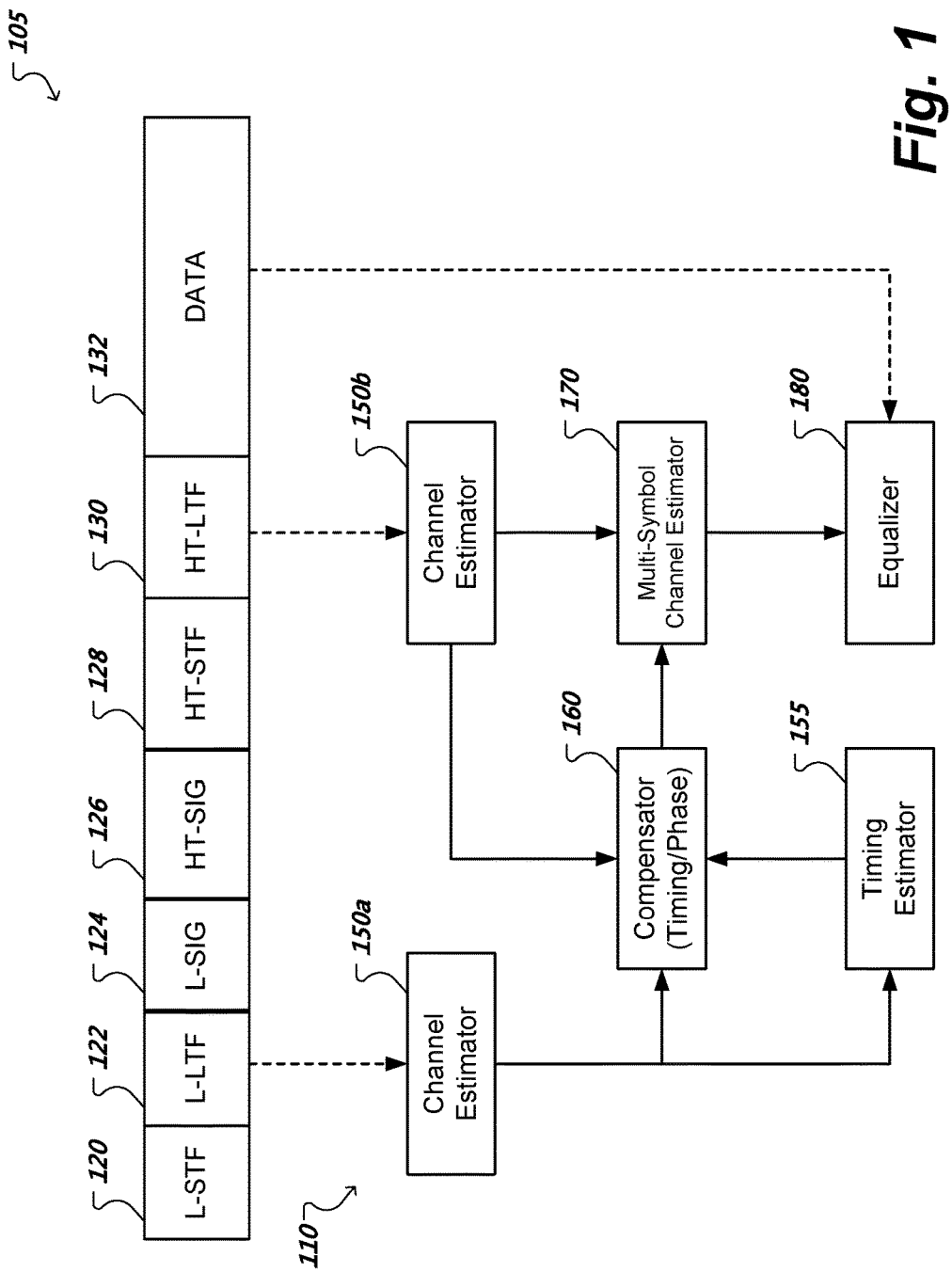
FIG. 1 shows a diagram of an example of a wireless device that includes a multi-symbol channel estimator that combines different types of training fields within a PPDU to produce channel estimates.

FIG. 1 shows a diagram of an example of a wireless device 110 that includes a multi-symbol channel estimator 170 that combines different types of training fields within a packet such as a PPDU 105 to produce channel estimates. The wireless device 110 includes channel estimators 150a, 150b, timing estimator 155, compensator 160, a multi-symbol channel estimator 170, and an equalizer 180. The wireless device 110 can receive a PPDU 105 transmitted by another device over a wireless channel.

The PPDU 105 and its associated fields in this example are based on IEEE 802.11n. However, other versions of the IEEE 802.11 standard can be used. Here, the PPDU 105 includes a Legacy Short Training Field (L-STF) 120, a Legacy Long Training Field (L-LTF) 122, Legacy Signal Field (L-SIG) 124, and a High Throughput (HT) portion. The HT portion of the PPDU 105 includes a Signal Field (HT-SIG) 126, HT Short Training Field (HT-STF) 128, HT Long Training Field (HT-LTF) 130, and Data Field (DATA) 132. The DATA 132 portion of the PPDU 105 can include a cyclic prefix (CP).

The channel estimators 150a, 150b can produce L-LTF and HT-LTF channel estimates respectively based on the L-LTF 122 and HT-LTF 130 in the PPDU 105. Conventionally, the channel estimates produced by the HT-LTF channel estimator 150b, which are based on the different subcarriers of the HT-LTF 130, are used for decoding the DATA 132 portion of the PPDU 105. However, channel estimates from both estimators 150a-b can be combined to improve receiver sensitivity. Note that on the transmitter side, the L-LTF 122 and the HT-LTF 130 for a single stream of packets transmitted without beamforming are very similar with minor differences in band edges and direct current (DC) tones. As such, on the receiver side, the device 110 can use a multi-symbol channel estimator 170 to average the L-LTF channel estimates with the HT-LTF channel estimates. The resulting noise averaging can improve the channel estimates that are used to decode the DATA 132. This can yield improvements in the device's 110 sensitivity which can enable higher MCS modes to be used.

Before averaging the L-LTF and HT-LTF channel estimates, the device 110 uses a compensator 160 to compensate timing and phase differences between L-LTF 122 and HT-LTF 130. A timing estimator 155 can generate a dynamic timing advance estimate based on the L-LTF 122 to adjust sample timing. In some implementations, the compensator 160 can rotate the L-LTF channel estimate phases, on a per tone basis, to compensate for a dynamic timing advance adjustment during the HT-STF 128 and a common phase error (CPE) buildup from the L-LTF 122 to the HT-LTF 130. The multi-symbol channel estimator 170 averages HT-LTF channel estimates from channel estimator 150b with the compensated L-LTF channel estimates from channel estimator 150a to produce an averaged channel estimate.

In the device 110, a dynamic timing adjustment mechanism (not shown) can adjust the sampling time after the HT-STF 128 based on phase roll estimates on L-LTF 122:

$$y'=y(t+D_{TA})$$

where $D_{TA}$ represents a dynamic timing adjustment computed by the timing estimator 155. A dynamic timing adjustment can cause a phase roll change in the HT-LTF channel estimates as expressed by $$H'[k]=H[k]e^{-ikD_{TA}}$$

where k is the subcarrier index, and H[k] is the channel matrix for the k-th subcarrier. After fine frequency estimation and correction, a residual carrier frequency offset (CFO) build-up can cause a common phase error in HT-LTF channel estimates:

$$H''[k]=[k]e^{i^*\omega}$$

where ω represents the carrier frequency offset.

In more detail, the L-LTF channel estimator 150a can produce channel estimate values $C_{LLTF}[k]$ where k represents the k-th subcarrier within the L-LTF 122. The HT-LTF channel estimator 150b can produce channel estimate values $C_{HTLTF}[k]$ for a group of subcarriers where k represents the k-th subcarrier within the HT-LTF 130. In order to average L-LTF channel estimates with HT-LTF channel estimates, the L-LTF channel estimates are rotated to compensate a dynamic timing adjustment phase roll and a residual CFO common phase error.

To compensate for dynamic timing adjustment phase roll, the device 110 can compute $\theta_{DTA}[k]=2\pi k D_{TA}$ for each subcarrier. To compensate for phase error, the device 110 can compute, for each subcarrier, a phase difference value $\theta_{CPE}[k]$ for the k-th subcarrier based on a difference between an angular version $\theta_{LLTF}[k]$ of the L-LTF channel estimate $C_{LLTF}[k]$ and an angular version $\theta_{HTLTF}[k]$ of the HT-LTF channel estimate $C_{HTLTF}[k]$ for the k-th subcarrier, e.g., $\theta_{CPE}[k]=\theta_{HTLTF}[k]-\theta_{LLTF}[k]$. In some implementations, the angular version represents an angle in the complex plane based on the real and imaginary components of a complex-valued channel estimate.

The device 110 via compensator 160 computes per subcarrier rotation values:

$$\varphi[k]=\text{MeanCPE}+\theta_{DTA}[k]$$

where $$\text{MeanCPE} = \frac{1}{N_s}\sum_{k=1}^{N_s} \theta_{CPE}[k] = \theta_{DTA}[k]$$

and $N_s$ is the number of subcarriers. The device 110 via compensator 160 computes rotated L-LTF channel estimate values based on $$C_{LLTF}^{ROT}[k]=C_{LLTF}[k]e^{i^*\varphi[k]}$$

and computes averaged channel estimate values based on $$\text{AvgCE}[k]=(C_{LLTF}^{ROT}[k]+C_{HTLTF}[k])/2$$

using the multi-symbol channel estimator 170. The rotated L-LTF channel estimate values align with the HT-LTF channel estimate values in phase such that these values can then be averaged to improve the HT-LTF channel estimation.

In some implementations, the averaged HT-LTF channel estimate can then be directly used for CPE, and then for equalization and forward error correction (FEC) during the DATA 132 portion of the PPDU 105. In some implementations, channel smoothing can be performed on the HT-LTF channel estimates, L-LTF channel estimates, or both. Note that HT-LTF averaging can coexist with channel smoothing. In some implementations, the PPDU 105 can be transmitted as a single stream packet, automatic gain control (AGC) readjustment between the legacy and HT portion of the packet, e.g., during HT-STF 128, can be selectively enabled or disabled, beamforming can be disabled, and there may be no time domain cyclic delay diversity (CDD) difference between the legacy and HT portions of the PPDU 105.

Figure 2:
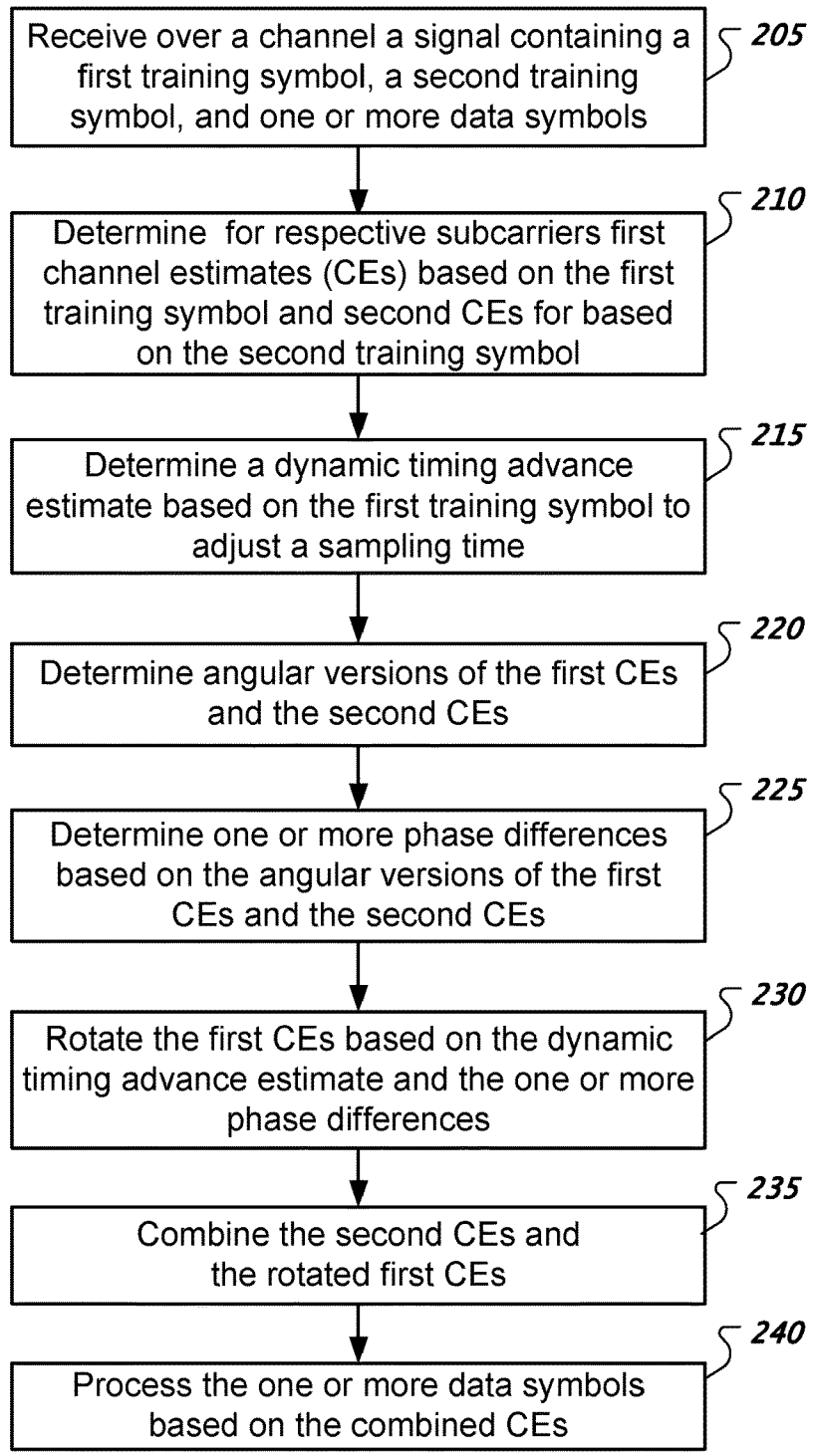
FIG. 2 shows a flowchart of an example of a multiple training symbol channel estimation process performed by a wireless device.

FIG. 2 shows a flowchart of an example of a multiple training symbol channel estimation process performed by a wireless device such as device 110. At 205, the wireless device receives over a channel a signal containing a first training symbol, a second training symbol, and one or more data symbols. The first training symbol and the second training symbol each includes two or more subcarriers such as OFDM subcarriers. The signal can represent a packet such as a PPDU that includes two or more types of training fields such as L-LTF and HT-STF. Other and different types of trainings fields can be used. For example, a very high throughput (VHT) training field can be used.

At 210, the device determines for respective subcarriers of the signal first channel estimates (CEs) based on the first training symbol and second CEs based on the second training symbol. In some implementations, the device can compare a received training symbol to a known training symbol to determine how the channel impacts gain and phase. In some implementations, device circuitry to determine the first CEs can be reused to determine the second CEs.

At 215, the device determines a dynamic timing advance estimate based on the first training symbol. The device can use the dynamic timing advance estimate to adjust sampling time for processing a remaining portion of the signal that includes the second training symbol.

At 220, the device determines angular versions of the first CEs and angular versions of the second CEs. The angular version can represent an angle in the complex plane derived from a complex-valued channel estimate's real and imaginary components. In some implementations, the device inputs channel estimates into a CORDIC (COordinate Rotation DIgital Computer) to produce such angles. In some implementations, the device performs phase unwrapping on the angular versions.

At 225, the device determines one or more phase differences for respective subcarriers based on the angular versions of the first CEs and the angular versions of the second CEs. In some implementations, determining phase differences can include subtracting, for each subcarrier, an angle for a CE derived from a L-LTF from an angle for a CE derived from a HT-LTF. In some implementations, determining a phase difference includes subtracting accumulated angles for respective CEs derived from different subcarriers of a L-LTF from accumulated angles for respective CEs derived from different subcarriers of a HT-LTF, and dividing the subtraction result by the number of accumulated angles to yield an average.

At 230, the device rotates the first CEs based on the dynamic timing advance estimate and the one or more phase differences. In some implementations, the device inputs the first CEs, dynamic timing advance estimate, and the one or more phase differences into a CORDIC, which is configured to perform channel estimate rotations. At 235, the device combines the second CEs and the rotated first CEs. In some implementations, combining CEs can include, for a given subcarrier, computing an average of a CE derived from a HT-LTF and a rotated CE derived from a L-LTF. At 240, the device processes the one or more data symbols based on the combined CEs. In some implementations, processing a data symbol includes using an equalizer that modifies the received version of the data symbol based on the combined channel estimates.

The device, in some implementations, can separate the subcarriers into at least a first group of subcarriers and a second group of subcarriers. These groups can be separated by one or more unused subcarriers such as a DC tone. To avoid phase discontinuities, the device can perform separate phase unwrap operations on the angular versions for the first group of subcarriers and the second group of subcarriers. The device can determine separate common phase errors for the groups using the separately phase unwrapped angular versions and then compute a mean CPE based on the separate common phase errors.

Figure 3:
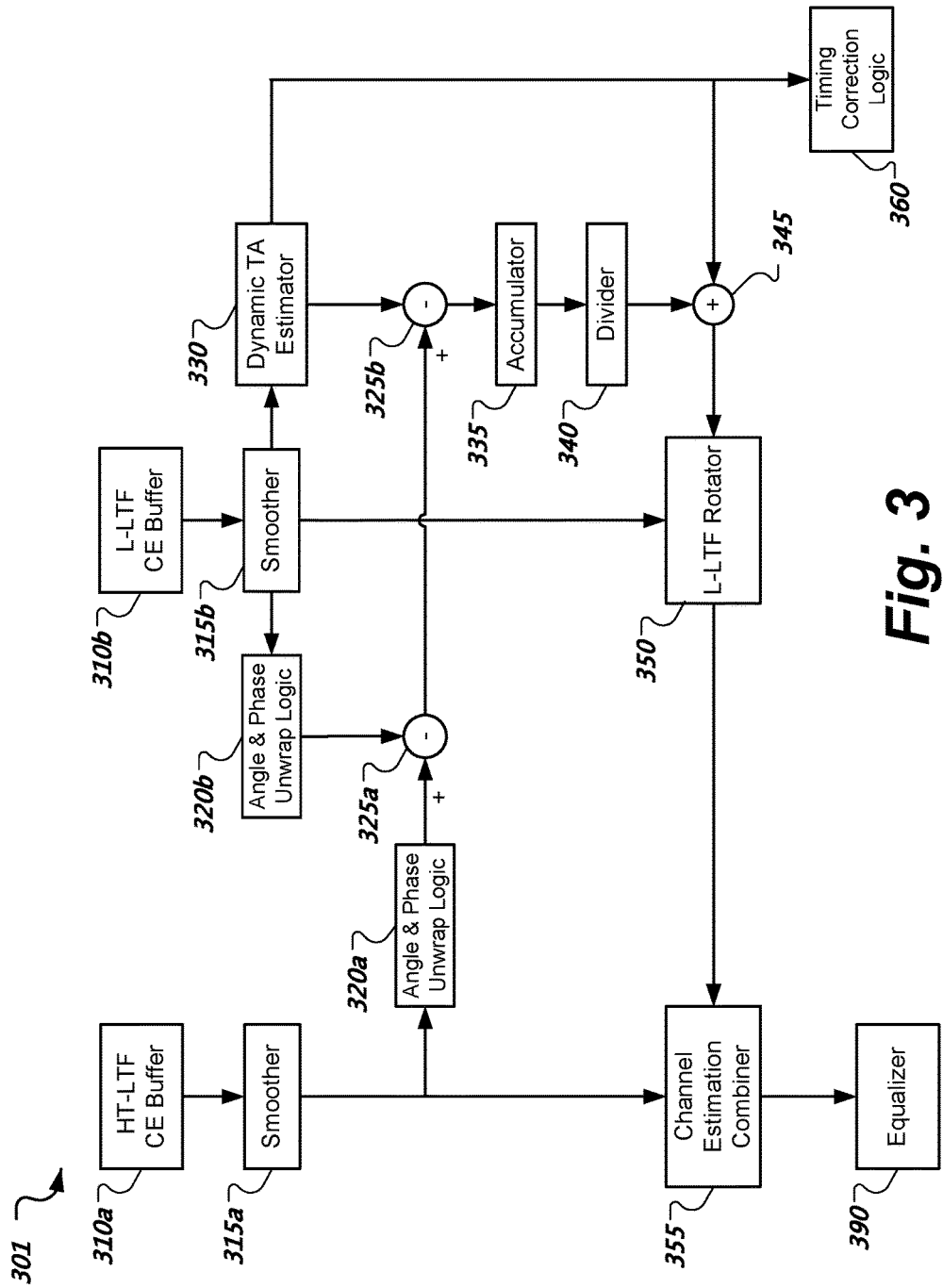
FIG. 3 shows a block diagram of an example of a system that determines averaged channel estimates based on different training fields in a PPDU.

FIG. 3 shows a block diagram of an example of a system 301 that determines averaged L-LTF and HT-LTF channel estimates. The system 301 includes buffers 310a, 310b to store HT-LTF and L-LTF information such as channel estimation values respectively. In some implementations, the buffers 310a, 310b are formed in a channel estimation memory. The HT-LTF buffer 310a stores channel estimation values $C_{HTLTF}[k]$ for a group of subcarriers where k represents the k-th subcarrier within a HT-LTF symbol, the values being derived from the HT-LTF symbol in a received signal. The L-LTF buffer 310b stores channel estimation values $C_{LLTF}[k]$ where k represents the k-th subcarrier within a L-LTF symbol, the values being derived from the L-LTF symbol in a received signal.

Smoothers 315a, 315b can perform channel smoothing on channel estimates, e.g., $C_{HTLTF}[k]$ and $C_{LLTF}[k]$ that are respectively stored in the buffers 310a, 310b to produce smoothed channel estimate values, e.g., $\hat{C}_{HTLTF}[k]$ and $\hat{C}_{LLTF}[k]$. Channel smoothing can include averaging adjacent channel estimations generated respectively for adjacent subcarriers of the training fields, e.g., L-LTF or HT-LTF, to remove noise, improve signal quality, or both. In some implementations, adjacent channel averaging is performed in the frequency domain. In some implementations, channel smoothing includes calculating a phase roll of adjacent subcarriers and compensating for the phase roll.

Angle & phase unwrap logic 320a, 320b can convert the smoothed channel estimate values, e.g., $\hat{C}_{HTLTF}[k]$ and $\hat{C}_{LLTF}[k]$, from the smoothers 315a-b into respective angles, e.g., $\theta_{HTLTF}[k]$ and $\theta_{LLTF}[k]$, where $\theta_{HTLTF}[k]$ represents a phase unwrapped angle based on an HT-LTF channel estimate for the k-th subcarrier and $\theta_{LLTF}[k]$ represents a phase unwrapped angle based on an L-LTF channel estimate for the k-th subcarrier. A technique for phase unwrapping is presented below; see, for example, FIG. 6 and its associated description. Subtractor 325a performs, for each used subcarrier, $\theta_{HTLTF}[k]-\theta_{LLTF}[k]$ to output $\theta_{CPE}[k]$. In some implementations, the angles can be represented as normalized angles.

In some implementations, a dynamic TA estimator 330 is configured to output $\theta_{DTA}[k]$ for each subcarrier index. In some implementations, the dynamic TA estimator 330 is configured to output $D_{TA}$ value, and other components convert the $D_{TA}$ value into a per subcarrier value $\theta_{DTA}[k]$ for each subcarrier index. Timing correction logic 360 can use a $D_{TA}$ value generated by the dynamic TA estimator 330 to adjust sample timing during subsequent signal reception periods.

Subtractor 325b is configured to perform $\theta_{CPE}[k]-\theta_{DTA}[k]$ based on outputs from substractor 325a and Dynamic TA Estimator 330. The accumulator 335 accumulates the $\theta_{CPE}[k]-\theta_{DTA}[k]$ difference values from subtractor 325b. After accumulator 335 accumulates values for $N_s$ subcarriers, the divider 340 is configured to divide the output from the accumulator 335 by $N_s$ to produce to a MeanCPE value. The adder 345 adds the MeanCPE value to the $\theta_{DTA}[k]$ values to produce respective $\varphi[k]$ values.

The L-LTF rotator 350 can compensate for a dynamic timing advance adjustment and CPE by applying $\varphi[k]$ values to the respective smoothed L-LTF channel estimates from smoother 315b to produce rotated L-LTF channel estimates. The channel estimation combiner 355 averages the HT-LTF channel estimates from smoother 315a with the rotated L-LTF channel estimates from rotator 350 to produce combined channel estimates that the equalizer 390 uses to process a data payload.

Figure 4:
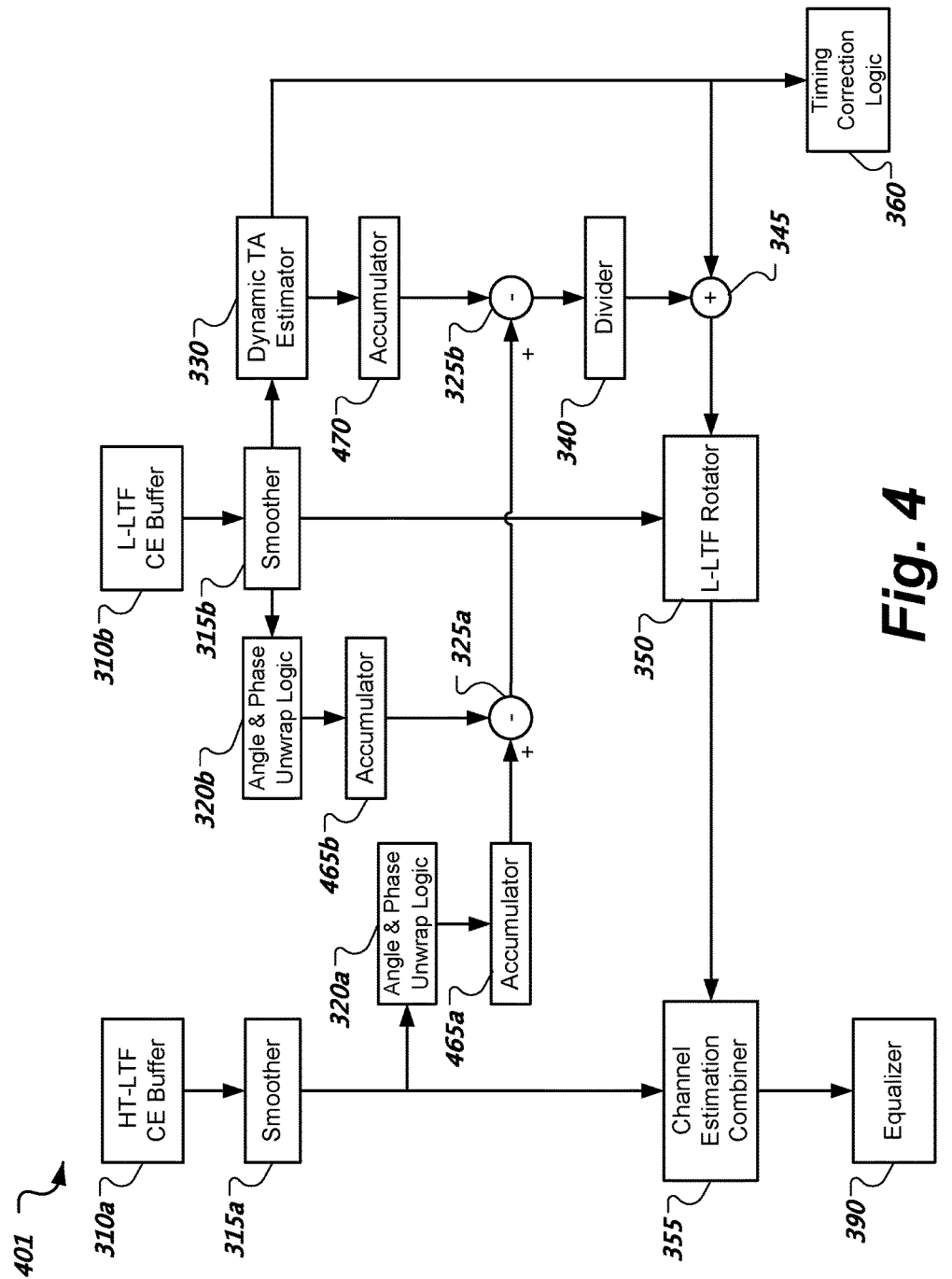
FIG. 4 shows a block diagram of another example of a system that determines averaged channel estimates based on different training fields in a PPDU

FIG. 4 shows a block diagram of another example of a system 401 that determines averaged L-LTF and HT-LTF channel estimates. The system 401 of FIG. 4 is similar to that of system 301 of FIG. 3, however, a different accumulator technique is employed. This technique for channel estimation is based on changing the order of accumulation and summation from $$\sum_{k=1}^{N_s} (\theta_{HTLTF}[k] - \theta_{LLTF}[k] - \theta_{DTA}[k])$$

$$\sum_{k=1}^{N_s} \theta_{HTLTF}[k] - \sum_{k=1}^{N_s} \theta_{LLTF}[k] - \sum_{k=1}^{N_s} \theta_{DTA}[k]$$

to
where $\theta_{LLTF}[k]$ represents an angle based on an L-LTF channel estimate for the k-th subcarrier, and $\theta_{HTLTF}[k]$ represents an angle based on an HT-LTF channel estimate for the k-th subcarrier. In some implementations, $\theta_{LLTF}[k]$ represents an angle based on a smoothed L-LTF channel estimate for the k-th subcarrier, and $\theta_{HTLTF}[k]$ represents an angle based on a smoothed HT-LTF channel estimate for the k-th subcarrier. Breaking the summation into separate summations can reduce memory usage and the time required for computation since the L-LTF channel estimate is available before the HT-LTF channel estimate. In some implementations, an accumulator can be time shared and used for both the L-LTF channel estimation and the HT-LTF channel estimation.

As noted above, the system 401 of FIG. 4 is similar to that of system 301 of FIG. 3, however, a different accumulator technique is employed. In this example, system 401 includes an accumulator 465a that accumulates, over $N_s$ subcarriers, the outputs from angle and phase unwrap logic 320a which is based on the HT-LTF training symbol. System 401 includes another accumulator 465b that accumulates, over $N_s$ subcarriers, the outputs from angle and phase unwrap logic 320b which is based on the L-LTF training symbol. In some implementations, accumulator 465a and accumulator 465b are the same and a buffer is used to buffer the accumulated L-LTF value while the HT-LTF values are being accumulated. System 401 includes another accumulator 470 that accumulates, over $N_s$ subcarriers, per subcarrier timing values $\theta_{DTA}[k]$ from the dynamic TA estimator 330. After the system 401 accumulates data for $N_s$ subcarriers, the subtractor 325a subtracts the accumulated L-LTF output from accumulator 465b from the accumulated HT-LTF output from accumulator 465a. Next, subtractor 325b subtracts the accumulated output from accumulator 470 from the output of subtractor 325a, which is subsequently divided by the $N_s$ subcarriers via divider 340.

A multi-channel estimation technique can include computing smoothed L-LTF channel estimates and smoothed HT-LTF channel estimates for respective tones. The technique further includes computing a phase difference between HT-LTF and L-LTF on each tone after HT-LTF channel estimation and smoothing. The technique includes feeding smoothed L-LTF channel estimates into a CORDIC or other hardware to obtain per subcarrier angles $\theta_{LLTF}[k]$ The angles can be unwrapped and accumulated before the arrival of the HT-LTF portion of a PPDU. The technique includes feeding smoothed HT-LTF channel estimates into a CORDIC or other hardware to obtain per subcarrier angles $\theta_{HTLTF}[k]$.

Angles for both HT-LTF and L-LTF can be phase unwrapped and accumulated. The difference of accumulated angles:

$$\sum_{k=1}^{N_s} \theta_{HTLTF}[k] - \sum_{k=1}^{N_s} \theta_{LLTF}[k] - \sum_{k=1}^{N_s} \theta_{DTA}[k]$$

can be computed and mean CPE can be available within a few cycles after the end of HT-LTF channel estimation and smoothing. Note that these summations can be implemented in a piecewise fashion using an accumulation register that is incremented by each new angle computed by a CORDIC.

The L-LTF channel estimates are rotated before averaging with the HT-LTF channel estimates. Per subcarrier L-LTF channel estimates can be rotated by a total phase MeanCPE+ $\theta_{DTA}[k]$ using a CORDIC. After L-LTF rotation and averaging with HT-LTF, the averaged channel estimates can be used to process the data payload of the PPDU.

A wireless device, in some implementations, can perform AGC during the HT-STF portion of the PPDU. However, in some implementations, the AGC can be disabled such that the AGC gain distribution and phase remains the same between the L-LTF and HT-LTF to avoid degradation in averaging L-LTF and HT-LTF channel estimates. Alternatively, AGC can be used and appropriate magnitude and phase compensation can be applied. If AGC is used, the wireless device can estimate the magnitude difference between L-LTF and HT-LTF. Note that the additional phase difference between L-LTF and HT-LTF can be automatically adjusted via the MeanCPE computation. The device can scale L-LTF channel estimates based on the estimated magnitude to compensate for any AGC changes and then rotate L-LTF per tone before averaging.

Figure 5:
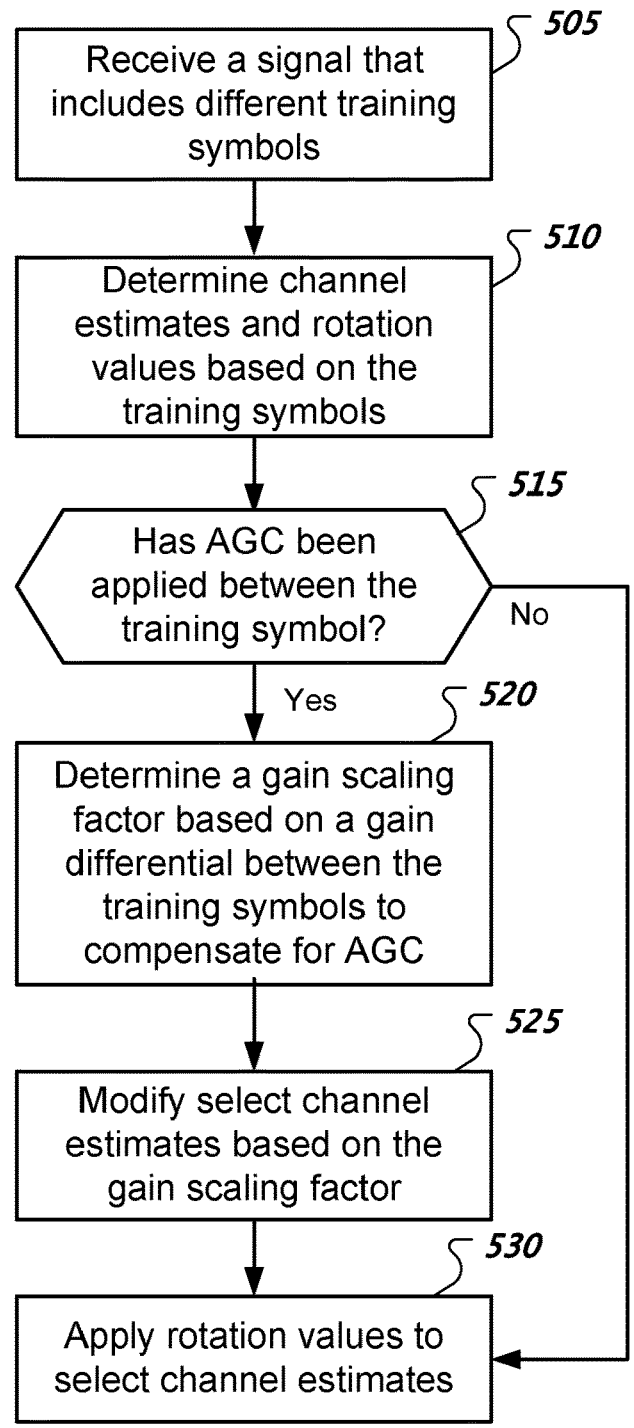
FIG. 5 shows a flowchart of an example of a process to selectively compensate automatic gain control for a multi-symbol channel estimation technique.

FIG. 5 shows a flowchart of an example of a process to selectively compensate AGC for a multi-symbol channel estimation technique. At 505, the device receives a signal that includes different training symbols. At 510, the device determines channel estimates and rotation values based on the training symbols. At 515, the device determines whether AGC has been applied between the training symbol. In some implementations, the device includes a controller that selectively enables or disables AGC between different symbols within a packet. If AGC was disabled, then the device at 530 applies rotation values to select channel estimates, e.g., such as estimates derived from a L-LTF training symbol. If AGC was enabled between the training symbols, then the device at 520 determines a gain scaling factor based on a gain differential between the training symbols to compensate for the AGC. At 525, the device modifies select channel estimates, e.g., such as estimates derived from a L-LTF training symbol, based on the gain scaling factor. At 530, the device applies rotation values to select channel estimates. After rotation values have been applied, the select channel estimates can be combined with channel estimates from the subsequent training symbol.

In some implementations, one or more tones can be skipped in the phase error computation such as unused tones, a DC tone, one or more tones around the DC tone, and tones that may have inaccurate channel estimates resulting from channel nulls. In some implementations, tones used in 20 MHz bandwidth configurations can include [−26:−2, 2:26].

In some implementations, an estimator can divide the total set of tones in two or more subsets. To avoid a potential for phase discontinuity and possibility of error in computation because of skipped tones, the estimator can be configured to divide the tones into two or more subsets of contiguous tones. For example, the estimator can divide the tones into a first subset [−26:−2] and a second subset [2:26]. In some implementations, the estimator can separately unwrap the two or more tone subsets and carry out phase error computation separately for each subset. The final estimated CPE can be the average value of computed phase errors across all the subsets.

In some implementations, angle accumulator hardware can be time-shared across L-LTF and HT-LTF as L-LTF channel estimates can be available before HT-LTF channel estimates. In some implementations, phase error computation hardware can be time shared across tone subsets. In some implementations, the hardware can use a power of 2 number of tones, e.g., $N_s$ is a power of 2, to ease a division operation since division by a power of 2 number can be implemented using a shift instruction. If there are less than a power of 2 number of tones, the hardware can selectively reuse certain tones in CPE computation to ensure that the total number of tones used is a power of 2. For example, for 20 MHz bandwidth configurations, the hardware can use tones [−2:26, 2:26] with repetition of tones: 2:4:26 and −2:−4:−26 such that $N_s$ becomes 64.

Figure 6:
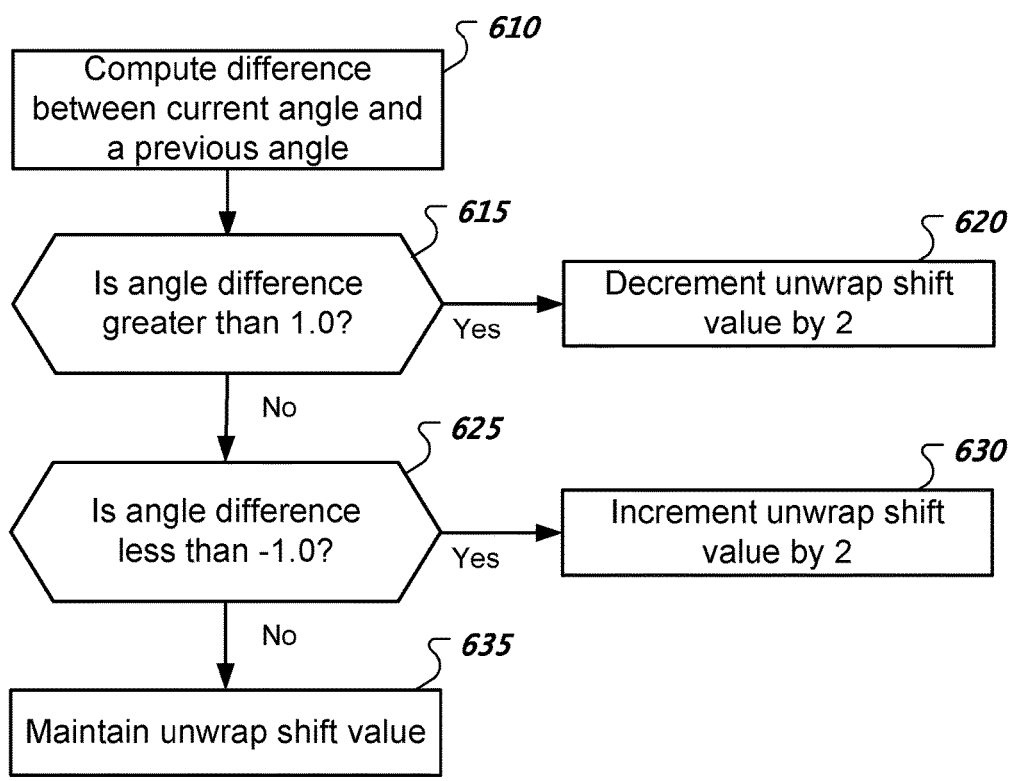
FIG. 6 shows a flowchart of an example of a phase unwrap process.

FIG. 6 shows a flowchart of an example of a phase unwrap process. A wireless device can perform a phase unwrap process to handle discontinuities, e.g., phase jumps, between computations associated with two adjacent subcarriers. In this example, the angular unit is relative radians. However, other types of angular units can be used. At 610, the process computes an angle difference between a current angle and a previous angle. In some implementations, the process accesses a register that stores a previous angle corresponding to the last subcarrier handled by the process. At 615, the process determines whether the angle difference is greater than 1.0. If it is greater, then at 620, the process decrements an unwrap shift value by 2. In some implementations, the process issues an instruction to decrement a unwrap shift register. Otherwise, at 625, the process determines whether the angle difference is less than −1.0. If it is less than −1.0, then at 630, the process increments the unwrap shift value by 2. In some implementations, the process issues an instruction to increment a unwrap shift register. However, if the angle difference is not greater than 1.0 or less than −1.0, then the process at 635 maintains the unwrap shift value at its current value. In some implementations, the unwrap shift value can be reset at the end of phase unwrapping. In some implementations, the unwrap shift value can be reset for each group of subcarriers.

Figure 7:
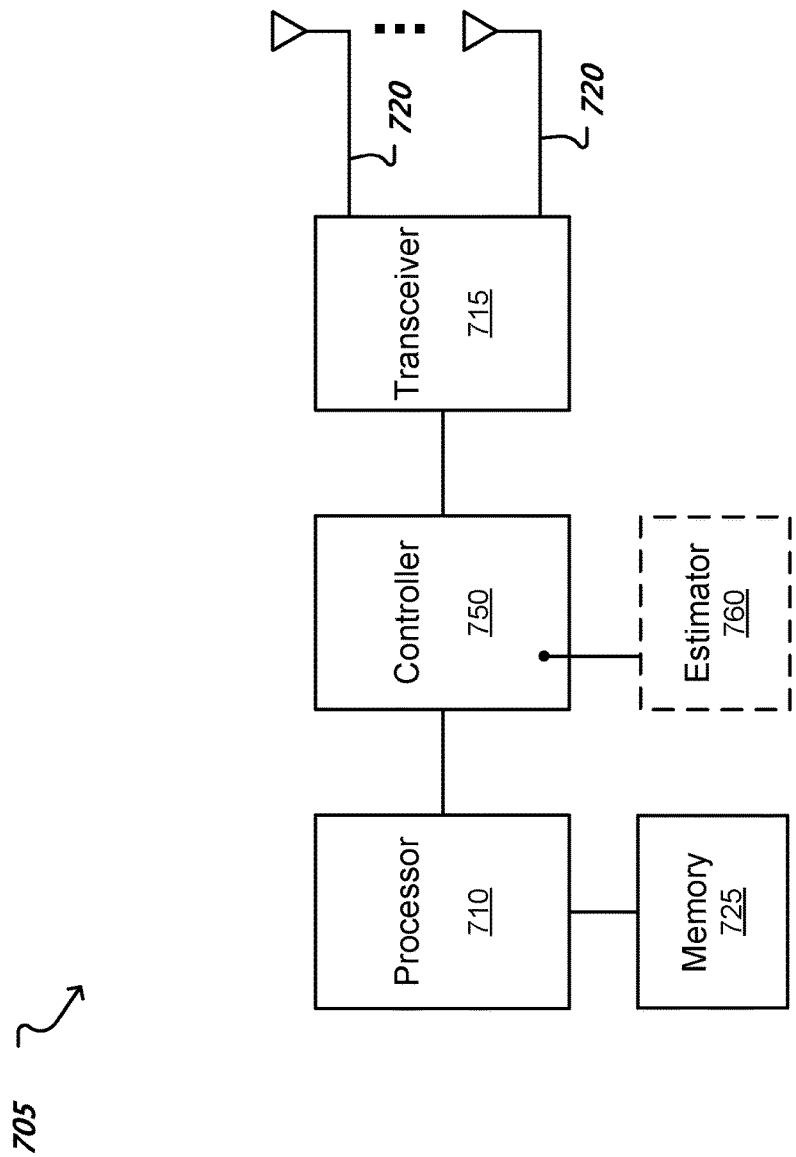
FIG. 7 shows a block diagram of an example of a wireless device.

FIG. 7 shows a block diagram of an example of a wireless device 705. The device 705 can implement methods effecting one or more techniques presented in this disclosure. Various examples of device 705 include an AP or a client wireless device. An AP can also be referred to as a base station (BS). A client device can also be referred to as a STA or mobile station (MS). In some implementations, the device 705 can be operated as an AP or as a client depending on a configuration parameter.

The wireless device 705 includes a transceiver 715 to send and receive wireless signals. In some implementations, the transceiver 715 includes a receiver and a transmitter. The transceiver 715 is coupled with one or more antennas 720. A controller 750 performs signal processing, such as channel estimation via estimator 760. The device 705 can implement channel estimation for various bandwidth configurations such as 20, 40, 80, or 160 MHz. Further, the estimator 760 can, after applying compensation, combine channel estimates derived from different types of training symbols within a received signal.

Further, the controller 750 can transfer data between a processor 710 and the transceiver 715. The device 705 includes the processor 710 and a memory 725. The memory 725 can store information such as data, instructions, or both. In some implementations, the memory 725 can store instructions to cause the processor 710 to generate data for transmission and to process received data via the transceiver 715.

In some implementations, a system for multi-symbol channel estimation can include a receiver to receive over a channel a signal comprising a first training symbol, a second training symbol, and one or more data symbols, the first training symbol and the second training symbol each comprise subcarriers; and a processor coupled with the receiver. The processor can be configured to perform operations. The operations can include determining first channel estimates for the subcarriers respectively based on the first training symbol and determining second channel estimates for the subcarriers respectively based on the second training symbol. The operations can include determining a dynamic timing advance estimate based on the first training symbol to adjust a sampling time for a remaining portion of the signal that includes the second training symbol. The operations can include determining one or more phase differences between the first training symbol and the second training symbol for the subcarriers respectively based on angular versions of the first channel estimates and angular versions of the second channel estimates; rotating the first channel estimates based on the dynamic timing advance estimate and the one or more phase differences to produce rotated first channel estimates; and producing combined channel estimates based on the second channel estimates and the rotated first channel estimates. The operations can include processing the one or more data symbols based on the combined channel estimates.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. An apparatus comprising:
a receiver to receive over a channel a signal comprising a first training symbol, a second training symbol, and one or more data symbols, wherein the first training symbol and the second training symbol each comprise subcarriers;
a channel estimator to determine first channel estimates for the subcarriers respectively based on the first training symbol and to determine second channel estimates for the subcarriers respectively based on the second training symbol;
a timing estimator to determine a dynamic timing advance estimate based on the first training symbol to adjust a sampling time for a remaining portion of the signal that includes the second training symbol;
a compensator to (i) determine one or more phase differences between the first training symbol and the second training symbol for the subcarriers respectively based on angular versions of the first channel estimates and angular versions of the second channel estimates, (ii) rotate the first channel estimates based on the dynamic timing advance estimate and the one or more phase differences to produce rotated first channel estimates, and (iii) produce combined channel estimates based on the second channel estimates and the rotated first channel estimates; and
circuitry to process the one or more data symbols based on the combined channel estimates.

2. The apparatus of claim 1, wherein the one or more phase differences comprise per subcarrier phase differences, wherein the compensator is configured to determine per subcarrier timing values based on subcarrier indices and the dynamic timing advance estimate, wherein the compensator is configured to determine a mean common phase error across the subcarriers based on the per subcarrier phase differences and the per subcarrier timing values, and wherein the compensator is configured to determine per subcarrier rotation values based on the mean common phase error and the per subcarrier timing values.

3. The apparatus of claim 2, comprising:
an accumulator to accumulate the per subcarrier phase differences to produce an accumulated phase difference output, wherein the mean common phase error is based on the accumulated phase difference output.

4. The apparatus of claim 1, comprising:
a first accumulator to accumulate the angular versions of the first channel estimates; and
a second accumulator to accumulate the angular versions of the second channel estimates,
wherein the one or more phase differences are based on a difference between an output from the second accumulator and an output from the first accumulator.

5. The apparatus of claim 1, wherein the subcarriers comprise a first group of subcarriers and a second group of subcarriers, wherein the first group of sub carriers and the second group of subcarriers are separated by one or more unused subcarriers, and wherein the compensator is configured to determine the one or more phase differences by performing separate phase unwrap operations for the first group of subcarriers and the second group of subcarriers.

6. The apparatus of claim 1, wherein the apparatus is configured to enable automatic gain control between reception of the first training symbol and reception of the second training symbol, and wherein the compensator is configured to determine a gain scaling factor to compensate for the automatic gain control, and wherein the rotated first channel estimates are based on the gain scaling factor.

7. The apparatus of claim 1, wherein the apparatus is configured to disable automatic gain control between reception of the first training symbol and reception of the second training symbol.

8. The apparatus of claim 1, wherein the channel estimator is configured to produce the first channel estimates and the second channel estimates by respectively applying channel smoothing among two or more adjacent subcarriers.

9. The apparatus of claim 1, wherein the first training symbol comprises a Legacy Long Training Field (L-LTF) symbol, and wherein the second training symbol comprises a High Throughput Long Training Field (HT-LTF) symbol.

10. A method comprising:
receiving over a channel a signal comprising a first training symbol, a second training symbol, and one or more data symbols, wherein the first training symbol and the second training symbol each comprise subcarriers;
determining i) first channel estimates for the subcarriers respectively based on the first training symbol and ii) second channel estimates for the subcarriers respectively based on the second training symbol;
determining a dynamic timing advance estimate based on the first training symbol to adjust a sampling time for a remaining portion of the signal that includes the second training symbol;
determining one or more phase differences between the first training symbol and the second training symbol for the subcarriers respectively based on angular versions of the first channel estimates and angular versions of the second channel estimates;

rotating the first channel estimates based on the dynamic timing advance estimate and the one or more phase differences to produce rotated first channel estimates;

producing combined channel estimates based on the second channel estimates and the rotated first channel estimates; and processing the one or more data symbols based on the combined channel estimates.

11. The method of claim 10, wherein the one or more phase differences comprise per subcarrier phase differences, wherein the method comprises:

determining per subcarrier timing values based on subcarrier indices and the dynamic timing advance estimate;

determining a mean common phase error across the subcarriers based on the per subcarrier phase differences and the per subcarrier timing values; and determining per subcarrier rotation values based on the mean common phase error and the per subcarrier timing values, wherein rotating the first channel estimates comprises using the per subcarrier rotation values.

12. The method of claim 11, comprising:

accumulating the per subcarrier phase differences to produce an accumulated phase difference output, wherein the mean common phase error is based on the accumulated phase difference output.

13. The method of claim 10, comprising:

accumulating, via a first accumulator, the angular versions of the first channel estimates; and accumulating, via a second accumulator, the angular versions of the second channel estimates, wherein the one or more phase differences are based on a difference between an output from the second accumulator and an output from the first accumulator.

14. The method of claim 10, wherein the subcarriers comprise a first group of subcarriers and a second group of subcarriers, wherein the first group of subcarriers and the second group of subcarriers are separated by one or more unused subcarriers, and wherein determining the one or more phase differences comprises performing separate phase unwrap operations for the first group of subcarriers and the second group of subcarriers.

15. The method of claim 10, comprising:

enabling automatic gain control between reception of the first training symbol and reception of the second training symbol; and determining a gain scaling factor to compensate for the automatic gain control, wherein the rotated first channel estimates are based on the gain scaling factor.

16. The method of claim 10, wherein determining the first channel estimates comprises applying channel smoothing among two or more adjacent subcarriers, and wherein determining the second channel estimates comprises applying channel smoothing among two or more adjacent subcarriers.

17. A system comprising:

a receiver to receive over a channel a signal comprising a first training symbol, a second training symbol, and one or more data symbols, wherein the first training symbol and the second training symbol each comprise subcarriers; and a processor coupled with the receiver, wherein the processor is configured to perform operations comprising:

determining first channel estimates for the subcarriers respectively based on the first training symbol;

determining second channel estimates for the subcarriers respectively based on the second training symbol;

determining a dynamic timing advance estimate based on the first training symbol to adjust a sampling time for a remaining portion of the signal that includes the second training symbol;

determining one or more phase differences between the first training symbol and the second training symbol for the subcarriers respectively based on angular versions of the first channel estimates and angular versions of the second channel estimates;

rotating the first channel estimates based on the dynamic timing advance estimate and the one or more phase differences to produce rotated first channel estimates;

producing combined channel estimates based on the second channel estimates and the rotated first channel estimates; and processing the one or more data symbols based on the combined channel estimates.

18. The system of claim 17, wherein the one or more phase differences comprise per subcarrier phase differences, wherein the operations comprise:

determining per subcarrier timing values based on subcarrier indices and the dynamic timing advance estimate;

determining a mean common phase error across the subcarriers based on the per subcarrier phase differences and the per subcarrier timing values; and determining per subcarrier rotation values based on the mean common phase error and the per subcarrier timing values, wherein rotating the first channel estimates comprises using the per subcarrier rotation values.

19. The system of claim 18, wherein the operations comprise:

accumulating the per subcarrier phase differences to produce an accumulated phase difference output, wherein the mean common phase error is based on the accumulated phase difference output.

20. The system of claim 17, wherein the subcarriers comprise a first group of subcarriers and a second group of subcarriers, wherein the first group of subcarriers and the second group of subcarriers are separated by one or more unused subcarriers, and wherein determining the one or more phase differences comprises performing separate phase unwrap operations for the first group of subcarriers and the second group of subcarriers.

* * * * *